Patented Aug. 30, 1932

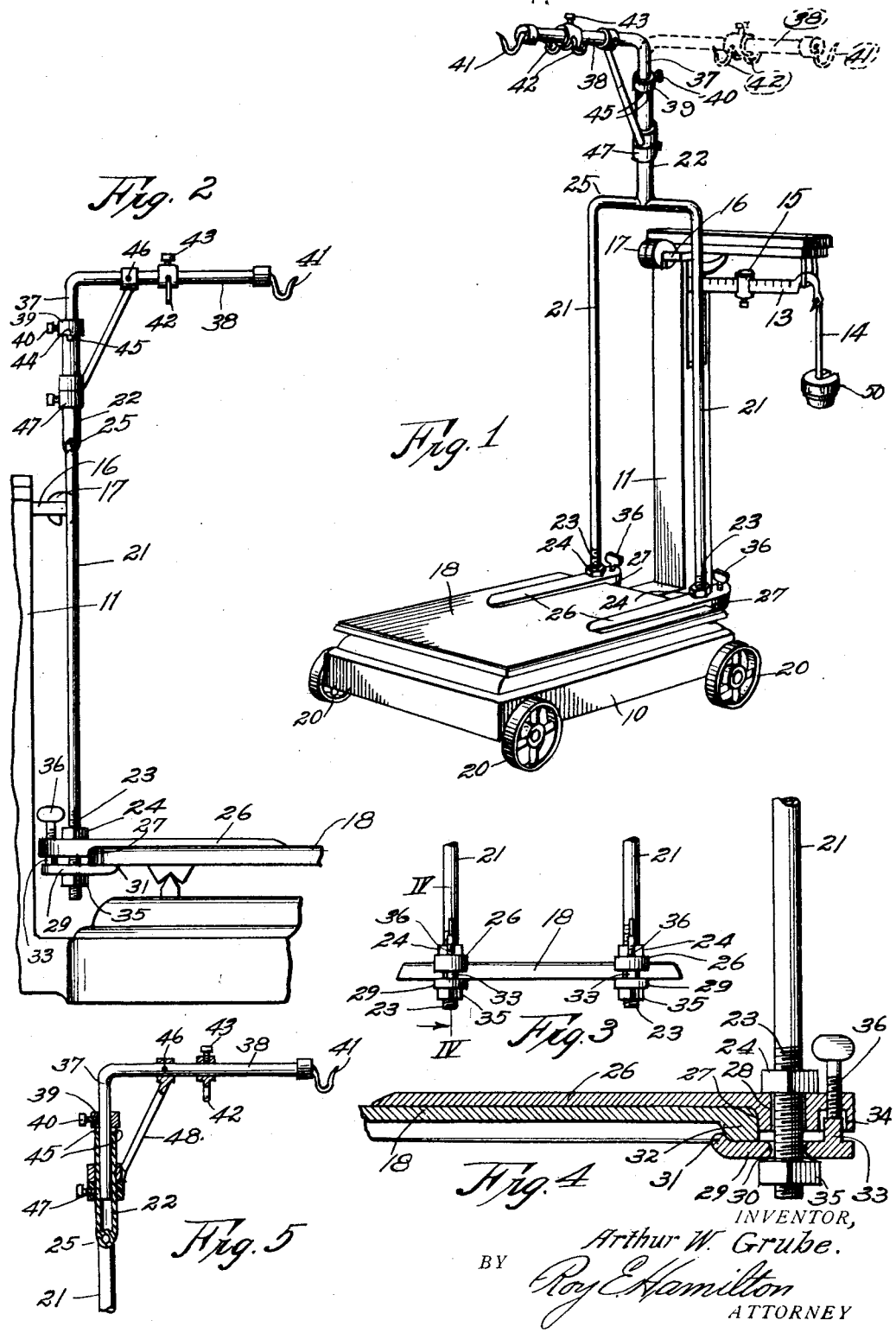

1,875,235

UNITED STATES PATENT OFFICE

ARTHUR W. GRUBE, OF KANSAS CITY, KANSAS

ATTACHMENT FOR PLATFORM SCALES

Application filed June 13, 1929. Serial No. 270,597.

This invention relates to attachment for platform scales, and particularly to an auxiliary commodity supporting device to be carried by the platform for weighing commodities which, owing to the peculiar size and shape, cannot be conveniently weighed on the platform itself.

One of the objects of the present invention is to provide a detachable commodity supporting device which when in the operative position on the platform does not interfere with the free use of any part of the platform for the reception of commodities to be weighed.

Another object of this invention is the provision of a commodity supporting device carried by the scale platform and having vertically disposed standards positioned to the end of said platform.

A further object of the present invention is the provision of a commodity supporting device having a vertically adjustable and horizontally rotatable commodity supporting arm adapted to be rotated to and from a position over the scale platform.

In general the objects of the invention are to provide an auxiliary commodity supporting device of simple and sturdy construction that is adjustable for use on the various types of platform scales, and one that is so positioned at the end of the platform that the entire platform will be free to receive commodities for weighing.

With these general objects in view as well as minor objects which will appear during the course of the detailed specification, reference will now be made to the accompanying drawing in which:

Figure 1 is a perspective view of a platform scale of the ordinary type, equipped with a commodity supporting device embodying this invention and with the supporting arm dotted in the inoperative position;

Fig. 2 is a side elevation of the commodity supporting device, in position on the platform scale, a part of which is broken away;

Fig. 3 is a fragmentary rear elevation of the scale platform with a part of commodity supporting device attached thereto;

Fig. 4 is a fragmentary enlarged sectional view taken on line IV—IV of Fig. 3;

Fig. 5 is a fragmentary sectional view of the upper portion of the commodity supporting device.

Like reference characters designate similar parts throughout the several views and the numeral 10 designates a scale frame mounted on wheels 20, and having a pillar 11, and a beam 13 on which is supported the weight supporting member 14 and a sliding poise 15. Positioned on the front of pillars 11 is a rack 16 adapted to receive the reserve weights 17. The weighing platform 18 is mounted in the usual manner so that the weight of articles placed thereon may be readily determined by the proper manipulation of the poise and weights.

The platform scale shown and described is the ordinary scale used in stores where commodities are sold by weight. Many commodities are of peculiar size and shape, such as bananas on the stem etc., so that they can not be readily placed on the platform for weighing. Also, the platform gets soiled and dirty so that it is not suitable for the reception of commodities such as meat, etc., which are not ordinarily provided with a cover.

It is the object of this invention to provide a suitable supporting detachable device by means of which such commodities may be supported during the operation of weighing.

The body portion or standard 25 of the commodity supporting device is of inverted U-shape including legs 21 and with a vertically extending socket member 22 projecting upwardly therefrom. 25 is preferably made of tubular material with the lower ends thereof threaded at 23 to receive nuts 24. The lower portion of each of the legs 21 is secured to platform 18 by means of a clamping device provided with an elongated thin foot member 26 having a shoulder 27 adapted to rest against the outer edge of the platform and which is provided with a vertically disposed opening 28 through which 21 passes. An adjustable clamping member 29 having a hole 30 through which 21 loosely fits is so positioned below 26 that it extends inwardly and is provided with an upturned portion 31 to engage the rim 32 on 18. The outer end of 29 has an upturned lug 33 that fits loosely into a recess 34 formed in the under side of 26. Screw threaded in 26 with its head extending thereabove is an adjusting screw 36 which is adapted to be adjusted to press downwardly on lug 33 so that 29 may be rocked on nut 35 carried by 21 to force 31 upwardly to the clamping position.

To mount the standard 25, the nut 35 is adjusted so that when the adjusting screw is screwed outwardly 31 will be separated from 26 a sufficient distance to permit the clamp to be slipped over the rim 32 after which 36 is screwed downwardly against 33 until 29 securely clamps the rim and secures the standard against any movement relative to the platform 18. It will be noted that 21 is threaded a sufficient distance to permit adjustment of nuts 24 and 35 to allow sufficient adjustment between 26 and 29 to span platform rims of different thicknesses.

Rotatably mounted in socket 22 is the downturned stem 37 of a horizontally disposed supporting arm 38 which is adapted to be selectively positioned directly over the platform 18 or at the side thereof. Stem 37 is provided with a set collar 39 having a set screw which is adjustable on the stem to vary the height of 38 above the platform. Arm 38 is provided at its outer end with a supporting hook 41 and a pair of adjustable hooks 42 adapted to be adjusted at any desired position thereon and secured against rotation by means of set screw 43. To secure the arm 38 against accidental rotation collar 39 is provided with a tooth 44 which engages one of the series of notches 45 formed in the upper end of 22. When it is desired to rotate 38 it is lifted until 44 disengages 45 then the arm may be positioned and secured against rotation by dropping 44 in the adjacent notch. For reinforcing the arm 38 a diagonal brace rod 48, rigidly secured to 38 at 46 and rotatably mounted on 22 to bear against an adjustable set collar 47 so as to take the downward thrust, is provided. When the height of the arm 28 above the platform is varied it is apparent that the set collar will necessarily be changed to properly support the lower end of 48.

When the supporting device is positioned on the scales it is necessary to add a weight 50 on 14 to properly balance the scales. However, this may be done by adding shot to the counterbalance in the usual manner.

With the construction as shown and described, it is apparent that the thin foot members will not interfere with the use of any part of the platform for supporting commodities to be weighed, also that the standards are carried beyond the end of the platform. The arm 38 may be positioned over the platform when being used or at the side thereof when not in use. Furthermore, the entire attachment may be readily removed from the scale platform as described above.

I do not wish to limit this invention to the structure shown and described as many modifications may be made within the scope of the appended claims without departing from the spirit thereof.

What I claim is:

1. A commodity supporting device for platform scales, comprising a standard including an inverted U-shaped body portion having a vertically disposed socket positioned thereon, a horizontally disposed supporting arm rotatably mounted in said socket and adapted to be rotated to and from a position above said platform.

2. A commodity supporting device for platform scales, comprising a standard carried by the scale platform without the confines of the edges thereof, a vertically disposed socket carried at the upper portion of said standard, a horizontally disposed and vertically adjustable supporting arm having a downturned stem rotatably mounted in said socket, and releasable means for securing said arm in a plurality of predetermined positions.

3. A commodity supporting device for platform scales, comprising a clamping device having a thin foot member adapted to rest on the scale platform and extend therebeyond, a clamping member positioned beneath said platform and extending therebeyond, means connecting said foot member and clamping member to adjust them to and from each other, a standard carried by said clamping device, and a horizontally disposed supporting arm having hooks supported thereon rotatably mounted on said standard and adapted to swing to and from a position over said platform.

4. A commodity supporting device for platform scales comprising an inverted U-shaped standard carried by the platform of said scales, a clamp for removably affixing each leg respectively of the inverted U-shaped standard to said platform, a vertically disposed socketed member integral with the base of said U-shaped member, a stem having an overhanging horizontal supporting arm rotatably mounted within said socket, a set collar carried by the stem, and interlocking means formed by said collar and vertically disposed socketed member whereby to selectively secure said stem and supporting arm against rotation within the socket.

5. A commodity supporting device for platform scales comprising an inverted U-shaped standard carried by the platform of said scale, a clamp for removably affixing each leg respectively of the inverted U-shaped standard to said platform, a vertically disposed socketed member integral with the base of said U-shaped member, a stem having an overhanging horizontal supporting arm rotatably mounted within said socket, a set collar carried by the stem, interlocking means formed by said collar and vertically disposed socketed member whereby to selectively secure said stem and supporting arm against rotation within the socket, a brace rod rigidly secured at one end to said supporting arm and having the other end thereof rotatably mounted about said vertical socketed member, and a set collar beneath said rotatably mounted end whereby to brace the supporting arm in any position to which it has been adjusted by said first mentioned set collar.

In testimony whereof, I hereunto affix my signature.

ARTHUR W. GRUBE.